(12) United States Patent
Soler et al.

(10) Patent No.: US 10,370,503 B2
(45) Date of Patent: Aug. 6, 2019

(54) MODIFIED POLY(ALKYLENE CARBONATE) COMPOSITION

(71) Applicant: NORNER IP AS, Stathelle (NO)

(72) Inventors: Carlos Barreto Soler, Porsgrunn (NO); Rodney W. Rychwalski, Bollebygd (SE); Siw Bodil Fredriksen, Skien (NO)

(73) Assignee: NORNER IP AS, Stathelle (NO)

( * ) Notice: Subject to any disclaimer, the term of this patent is extended or adjusted under 35 U.S.C. 154(b) by 222 days.

(21) Appl. No.: 14/760,356

(22) PCT Filed: Jan. 10, 2014

(86) PCT No.: PCT/EP2014/050420
§ 371 (c)(1),
(2) Date: Jul. 10, 2015

(87) PCT Pub. No.: WO2014/108518
PCT Pub. Date: Jul. 17, 2014

(65) Prior Publication Data
US 2015/0361228 A1     Dec. 17, 2015

(30) Foreign Application Priority Data

Jan. 11, 2013   (GB) .................... 1300538.4

(51) Int. Cl.
| | | |
|---|---|---|
| *C08G 64/42* | (2006.01) | |
| *C08J 3/24* | (2006.01) | |
| *C08K 3/04* | (2006.01) | |
| *C08K 3/26* | (2006.01) | |
| *C08K 3/34* | (2006.01) | |
| *C08K 9/04* | (2006.01) | |

(52) U.S. Cl.
CPC ............. *C08J 3/24* (2013.01); *C08G 64/42* (2013.01); *C08K 3/04* (2013.01); *C08K 3/041* (2017.05); *C08K 3/042* (2017.05); *C08K 3/26* (2013.01); *C08K 3/346* (2013.01); *C08K 9/04* (2013.01); *C08K 2003/265* (2013.01); *C08K 2201/011* (2013.01)

(58) Field of Classification Search
CPC ... C08J 3/24; C08J 3/005; C08J 3/203; C08G 64/42; C08K 3/04; C08K 3/26; C08K 3/346; C08K 9/04; C08L 67/04
USPC .......................................................... 524/612
See application file for complete search history.

(56) References Cited

U.S. PATENT DOCUMENTS

| | | | |
|---|---|---|---|
| 4,066,630 A | 1/1978 | Dixon et al. | |
| 4,686,273 A | 8/1987 | Harris | |
| 4,686,274 A * | 8/1987 | Harris .................... | C08G 64/42 525/462 |
| 2007/0117936 A1* | 5/2007 | Xiong ................... | C08F 220/14 525/326.8 |
| 2010/0041858 A1 | 2/2010 | Maruyama et al. | |
| 2012/0059078 A1 | 3/2012 | Kim et al. | |
| 2012/0208928 A1 | 8/2012 | Chen et al. | |

FOREIGN PATENT DOCUMENTS

| | | | |
|---|---|---|---|
| CN | 102775594 | 10/2014 | |
| EP | 0850971 A2 * | 7/1998 | ............ C08G 64/40 |
| EP | 1061093 | 12/2000 | |
| EP | 1264860 | 12/2002 | |
| JP | S64029423 | 1/1989 | |
| JP | H06263978 | 9/1994 | |
| JP | H09100403 | 4/1997 | |
| JP | 2010138326 | 6/2010 | |
| WO | WO9820073 | 5/1998 | |
| WO | WO2012099318 | 7/2012 | |
| WO | 2013007759 | 1/2013 | |

OTHER PUBLICATIONS

Database WPI, Week 201362, Thomson Scientific, London, AN 2013-C39074, XP002723918.

* cited by examiner

*Primary Examiner* — Kelechi C Egwim
(74) *Attorney, Agent, or Firm* — Meunier Carlin & Curfman LLC

(57) ABSTRACT

A process for the manufacture of a modified poly(alkylene carbonate) comprising compounding i) at least one poly (alkylene carbonate) and at least one modifying agent having at least three carboxylic acid groups, or ii) at least one carboxylic acid group and at least one anhydride group, or iii) at least two anhydride groups, at a temperature of 120 to 240° C.

18 Claims, No Drawings

MODIFIED POLY(ALKYLENE CARBONATE) COMPOSITION

FIELD OF THE INVENTION

The present invention relates to modified poly(alkylene carbonates), in particular, to poly(alkylene carbonates) modified via reaction with multicarboxylic acids or disguised multicarboxylic acids such as anhydrides and to articles made therefrom. The invention further relates to modified poly(alkylene carbonates) combined with fillers and/or other components of interest such as further polymers.

BACKGROUND

Until recently, poly(alkylene) carbonates have had limited commercial application. They have been used as sacrifice polymers in the electronics industry but in few other applications. Other applications of these polymers have been limited by their relative thermal instability and mechanical properties.

The present inventors have realised that these poly(alkylene carbonates) offer environmentally friendly potential. The use of carbon dioxide in the formation of poly(alkylene carbonates) provides a useful sink for carbon dioxide and therefore these polymers offer an environmentally friendly alternative to fossil fuel based materials such as a polyolefin. There are therefore significant benefits to using PACs industrially.

As noted above, commercial applications of some poly (alkylene carbonates) are limited by their low glass transition temperature(Tg) and low thermal stability. Furthermore, thermal decomposition of these polymers occurs at rather low temperatures, e.g. at 150-180° C. for poly(propylene carbonate) (PPC). These two properties severely limit the processability of PACs on a commercial scale. Methods for improving the properties of PACs so as to enhance the applicability of PACs are therefore sought. End capping of the poly(alkylene carbonate) is one route which has been investigated and, to date, some progress has been achieved.

In U.S. Pat. No. 4,066,630, end capping of poly(alkylene carbonate) is suggested through the addition of agents such as isocyanates, maleic anhydride and carboxylic acid monoanhydrides. The addition takes place at ambient temperature in a solvent and therefore involves reaction of the hydroxyl end groups of the poly(alkylene carbonate) with a reactive group in the end capping agent. The result is an increase in the decomposition temperature of the polymer.

Thus, the use of maleic anhydride as an end capping group is known in the art and has been found to improve thermal behaviour in these materials. The main idea behind end capping is that the presence of the end capping group prevents the "unzipping" reaction which can causes chain scission and hence thermal degradation of the polymer.

There remains, however, a need for new ways of improving the thermal stability of these environmentally friendly polymers. Also, the present inventors sought modification of PACs to improve other properties thereof, in particular their mechanical properties and optical properties, e.g. in relation to UV light. PACs have potential application in the replacement of polyolefins. It is well known that polymers are susceptible to degradation from UV light and hence additives are conventionally added to stop this happening.

The present inventors have surprisingly established that effective modification of PACs can be achieved by the addition of pyromellitic dianhydride or related polycarboxylic compounds. Surprisingly, these modifying compounds can provide much improved properties over the use of maleic anhydride, e.g. in terms of thermal properties, mechanical properties and optical properties.

In U.S. Pat. No. 4,686,274, certain poly(alkylene carbonate) polyols are modified through contact with a wide variety of modifying agents. The idea is to effect a transesterification reaction. This patent refers to low molecular weight PACs having Mw values of less than 5000 g/mol.

US2012/0059078 describes a poly(alkylene carbonate) for a sheet which can include a filler, flexibiliser and lubricant.

The present invention relies on the modification of the PAC via a compounding step in which the PAC is compounded together with a modifying agent, preferably by melt compounding at elevated temperature.

It is stressed therefore that the inventors consider modification of the PAC to occur via various means. Whilst end capping of the polymer chain is one such mechanism, it is believed that the use of a multicarboxylic acid or disguised carboxylic acid modifying group allows other mechanisms to come into play. Without wishing to be bound by any theory, it is suggested that such mechanisms could be for example coupling together polymer chains, optionally degraded polymer chains, to linear or branched structures. The compounded PAC of the invention, prepared using the modifying agents of the invention, surprisingly offers a commercially more attractive polymer than traditional end capping using mono- or dicarboxylic compounds such as maleic anhydride.

SUMMARY OF THE INVENTION

Thus, viewed from a first aspect the invention provides a process for the manufacture of a modified poly(alkylene carbonate) comprising compounding at least one poly(alkylene carbonate) and at least one modifying agent having at least three carboxylic acid groups or at least one carboxylic acid group and at least one anhydride group or at least two anhydride groups at a temperature of 120 to 240° C.

Viewed from another aspect the invention provides a process for the manufacture of a modified poly(alkylene carbonate) comprising compounding at least one poly(alkylene carbonate) and at least one modifying agent having at least three carboxylic acid groups or at least one carboxylic acid group and at least one anhydride group or at least two anhydride groups at a temperature of 120 to 240° C.; and
    subsequently combining said modified poly(alkylene carbonate) with at least one filler.

Alternatively, the invention provides a process for the manufacture of a modified poly(alkylene carbonate) comprising compounding at least one poly(alkylene carbonate) and at least one modifying agent having at least three carboxylic acid groups or at least one carboxylic acid group and at least one anhydride group or at least two anhydride groups and at least one filler at a temperature of 120 to 240° C.

Alternatively, the invention provides a process for the manufacture of a modified poly(alkylene carbonate) comprising compounding at least one poly(alkylene carbonate) which comprises a filler and at least one modifying agent having at least three carboxylic acid groups or at least one carboxylic acid group and at least one anhydride group or at least two anhydride groups at a temperature of 120 to 240° C.

Viewed from another aspect the invention provides a process for the manufacture of a modified poly(alkylene carbonate) comprising compounding at least one poly(alkylene carbonate) and at least one modifying agent having at least three carboxylic acid groups or at least one carboxylic acid group and at least one anhydride group or at least two anhydride groups at a temperature of 120 to 240° C.; and subsequently compounding said modified poly(alkylene carbonate) with at least one filler, e.g. at a temperature of 120° C. to 250° C. or mixing said modified poly(alkylene carbonate) with at least one filler in a solvent.

Viewed from another aspect the invention provides a composition obtained by a process as hereinbefore defined. In particular the invention provides a composition comprising at least one poly(alkylene carbonate) which has been modified by compounding at a temperature of 120 to 240° C. with at least one modifying agent having at least three carboxylic acid groups or at least one carboxylic acid group and at least one anhydride group or at least two anhydride groups.

Viewed from another aspect the invention provides a composition comprising:

(I) at least one poly(alkylene carbonate) which has been modified by compounding at a temperature of 120 to 240° C. with at least one modifying agent having at least three carboxylic acid groups or at least one carboxylic acid group and at least one anhydride group or at least two anhydride groups; and (II) at least one filler.

Viewed from another aspect the invention provides an article made from a modified poly(alkylene carbonate) as hereinbefore described, such as a film, moulded article, e.g. bottle, extrusion coating, foamed article or laminate.

Viewed from another aspect the invention provides use of a modifying agent having at least three carboxylic acid groups or at least one carboxylic acid group and at least one anhydride group or at least two anhydride groups to increase, for example, the thermal decomposition temperature and stiffness of a poly(alkylene carbonate).

DETAILED DESCRIPTION OF THE INVENTION

Poly(alkylene carbonate)

The processes of the invention involves the modification of a poly(alkylene carbonate) (PAC). The term poly(alkylene carbonate) is used to indicate that the polycarbonates of this invention are free of aromatic groups in the main backbone of the polymer. They can however, contain cyclic, non aromatic groups in the backbone. These cyclic groups can be saturated or unsaturated. The poly(alkylene carbonates) of the invention are not therefore based on bisphenol-A type products or reactions involving phosgene. The PACs are otherwise broadly defined.

The backbone of the PACs of the invention contains O—C(=O)—O linkages along with a non aromatic linker between those linkages.

The backbone of the polymer can however, carry a wide variety of substituents (side chains) including aromatic side groups and various functional groups.

The PAC is preferably one formed from the polymerisation of carbon dioxide with a cyclic ether or perhaps from the ring opening of a cyclic carbonate. The term cyclic ether is used here to cover not only epoxides (3-membered cyclic ethers) but also larger cyclic ethers such as those based on 4-6 membered rings or more. Preferably, the cyclic ether is an epoxide such as alkylene based epoxide.

For example, the reaction of the four membered ring ether oxirane with carbon dioxide gives polytrimethylene carbonate (Darensbourg, D. J. Inorg. Chem. 2010, 49, 10765-10780).

Suitable (non epoxide) cyclic ether monomers are therefore of formula (II)

where a is 0-2 and $R_5$ is the same as $R_1$ below. The number of $R_5$ groups which may be present may be the same as the number of carbon atoms in the ring of the cyclic ether (e.g. up to 5). Preferably however, only 1 such group is present, if at all.

Alternatively, PACs can be formed during the ring opening of a cyclic carbonate with a variety of catalysts as described in e.g. Suriano Polym. Chem., 2011, 2, 528-533; Endo et al. Journal of Polymer Science Part A: Polymer Chemistry 2002, 40(13), 2190-2198.

As long as the backbone of the PAC does not contain an aromatic group within the backbone then any method can be used to form the PACs of the invention.

It is most preferred however if the PACs are obtained through the polymerisation of a cyclic ether with carbon dioxide and especially through the polymerisation of carbon dioxide and an epoxide. Preferably, the epoxide of use in the invention is of formula (I)

wherein $R_1$ to $R_4$ are each independently hydrogen; $C_{1-10}$ alkyl optionally interrupted by one or more heteroatoms selected from O or N; $C_{2-10}$-alkenyl optionally interrupted by one or more heteroatoms selected from O and N; C6-10-aryl; or $R_2$ and $R_3$ taken together can form a non aromatic, cyclic group having 4 to 8 atoms in the ring, said ring optionally comprising one or more heteroatoms selected from O or N;

said non aromatic cyclic group or any of $R_1$ to $R_4$ being optionally substituted by one or more $C_{1-6}$ alkyl groups, $C_{2-10}$-alkenyl groups, C6-10-aryl groups, —$OC_{1-6}$ alkyl groups or OH.

It is preferred if at least one, preferably at least two of $R_1$ to $R_4$ are hydrogen. Ideally, the carbon atoms attached to the epoxide should also be bonded directly to a hydrogen atom. In a highly preferred embodiment, three of $R_1$ to $R_4$ are hydrogen, and one is an alkyl group, preferably a methyl group, thus forming propylene oxide, or all 4 are hydrogen (thus forming ethylene oxide).

When not hydrogen, it is preferred if substituents $R_1$ to $R_4$ are $C_{1-6}$-alkyl or $C_{2-6}$-alkenyl groups. If an alkenyl group is present, the double bond should preferably not conjugate the epoxide. Any alkenyl group should preferably contain at least 3 carbon atoms and the double bond should be at least beta to the epoxide carbon. Alternatively, it is also preferred that one of the substituents is an alkoxy group (thus forming for example glycidyl ethers).

If $R_2$ and $R_3$ are taken together, they preferably form a 5 or 6 membered ring with the carbon atoms to which they are attached, especially a carbocyclic ring. That ring can be saturated or monounsaturated, preferably saturated. A 6-membered ring is in particular preferred.

In formula (I), it is preferred if no heteroatoms other than the O of the epoxide are present. It is also preferred if compounds of formula (I) are free of alkenyl groups.

A preferred monomer is therefore of formula (II)

(II)

where $R_{2'}$ and $R_{3'}$ are independently hydrogen, C1-6 alkyl, phenyl or $R_{2'}$ and $R_{3'}$ taken together form a 5 or 6 saturated or monounsaturated carbocyclic ring, preferably where one or both of $R_{2'}$ and $R_{3'}$ are hydrogen, $R_{2'}$ is hydrogen and $R_{3'}$ is methyl. Preferred epoxide monomers include limonene oxide, styrene oxide, propylene oxide, ethylene oxide or cyclohexene oxide, i.e. the compound

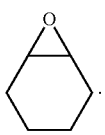

The use of propylene oxide is especially preferred.

It will be appreciated that the polymerisation reaction takes place in the presence of carbon dioxide. In an ideal scenario, the PAC of the invention is one such as

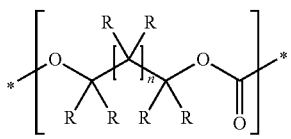

where n is 0 to 4 and R is a side chain such as defined above for $R_1$ to $R_4$.

In particular the PAC of the invention may be:

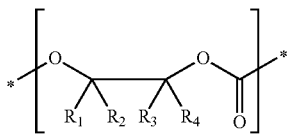

It will be appreciated, however, that when the epoxide and the carbon dioxide are polymerised, the structure of the polymer which forms may not be a perfectly alternating ABABA type polymer as depicted here. The invention encompasses the polymer which forms when these two monomers are polymerised. The polymer regioregularity may be described by the "head to tail" ratio as used in the conventional sense for polyalkylene carbonates and determined as described e.g. in Lednor et al. J. Chem. Soc. Chem. Commun. 1985, 598-599.

Further, the polymer chains may also include blocks of e.g. epoxide monomer residues as is well known. It is very common for ether linkages to be present in PACs. It is preferred if the content of polymer chains containing ether linkages is less than 15 wt %, preferably less than 10 wt %. The ether content can be determined by $^1$H NMR e. g. as described in Luinstra, G. Polymer Reviews, 48:192-219, 2008.

It is of course possible for a mixture of cyclic ether monomers to be used to produce the poly(alkylene carbonate) used in the invention, especially ones free of any groups that could partake in a cross-linking reaction (such as alkenyl groups).

It is also possible for other monomers to be present in the PACs of the invention. For example, a difunctional or poly functional epoxide can be present during the polymerisation reaction in addition to the monomers described above. Typically this will be added in small amounts, e.g. less than 1 wt % of the reaction mixture as a whole, preferably less than 0.1 wt % of the reaction mixture.

It is also within the scope of the invention for other monomers to be used in the manufacture of the PAC. For example, the use of lactone monomers is envisaged. Lactone monomers of interest include β-propiolactone, γ-butyrolactone, δ-valerolactone, ε-caprolactone. The use of lactones typically results in the formation of block polymers (see Huiser et at Macromolecules, 2011, 44 (5), pp 1132-1139, Lu and Huang, Journal of Polymer Science Part A: Polymer Chemistry, Volume 43 (12) 2468-2475, 2005; Hwang et al. Macromolecules 2003, 36, 8210-8212).

As noted above, PACs can have varying degrees of regularity, in particular depending on the nature of the catalyst used to manufacture the polymer. In some embodiments on the invention the PACs may be highly regioregular. Where an epoxide monomer is not symmetrical, it is possible for the addition of each monomer to proceed in differing fashion. The invention covers all different regio-regularities.

Other PACs of interest are formed in the presence of chain transfer agents. When chain transfer agents are present in the polymerization or when coupling agents are added, these substances can give raise to special polymer architectures.

Preferably however, the PAC is formed from the polymerisation of carbon dioxide and epoxide(s) of formula (I) only. In particular the PAC is polypropylene carbonate (PPC), polyethylene carbonate (PEC) or polycyclohexene carbonate (PCHC), most especially polypropylene carbonate. A further option is PCHC-PPC formed from carbon dioxide, propylene oxide and cyclohexene oxide. It will of course be possible to use a mixture of different PAC's in the process of the invention. Preferably, the PAC can also be a polymer formed by the polymerisation of $CO_2$ and at least two different epoxide monomers carrying no substituents or only alkyl substituents, in particular by the polymerisation of $CO_2$, and two or more of ethylene oxide, propylene oxide and cyclohexene oxide.

Catalysts

Several catalyst systems are known that catalyze the copolymerisation reaction of epoxides and $CO_2$. The polymerisation can be catalysed by known catalysts, especially Zn based catalysts, Mg based catalysts or Co based catalysts such as cobalt salen catalysts. The use of zinc and magnesium catalysis, e.g. heterogeneous or homogeneous mono- or multinuclear Zn catalysis is preferred. Most preferably these carboxylates are zinc glutarates, e. g. as described in U.S. Pat. No. 4,789,727 and in Ree et al. *J. Pol. Sci. Part A.: Polymer Chemistry* Vol. 37, 1873-1876 (1999)

or other zinc based catalysts e. g. such as macrocyclic zinc complexes as described in WO2009/130470. Magnesium catalysts are typically macrocyclic magnesium catalysts such as described in WO2009/130470. Cobalt based catalysts are typically cobalt salen catalysts as described in WO2010/028362 and in Cyriac et al. Macromol. 2010, 7398-7801. Catalysts may need a cocatalyst as is well known in the art, e. g. as described in WO2010/028362.

Other well known catalysts for PAC formation are based on homogeneous reaction systems and include porphyrin systems such as DMAP. The use of phenoxide catalysts is also a possibility as well as the use of β-diiminate catalysts. As noted above, Co based salen systems are also of interest. A comprehensive discussion of available catalysts can be found in Coord Chem Rev (2011), Klaus et al. and in Kember et al. Chem. Commun. 2011, 47, 141-163. The skilled man is capable of choosing an appropriate catalyst. The catalyst will preferably contain a metal.

The procedures required to polymerise the monomers to form PACs are well known and are described in the literature. PACs are also commercially available products e.g. from Empower Materials.

The PACs of the invention can be amorphous or semicrystalline. Typically they are amorphous. Preferably they will have a glass transition temperature (Tg) of at least 0° C., preferably at least 10° C., such as at least 15° C., such as at least 20° C. It will be appreciated that the Tg will depend heavily on the nature of the PAC in question.

The number average molecular weight Mn of the PAC may be at least 1500 g/mol, preferably at least 2000 g/mol. The use of higher Mn PACs is preferred in this invention. Values of at least 10,000, 11 Jan. 2013 preferably at least 20,000 are therefore preferred. Mn can be measured by GPC.

The Mw/Mn of the PAC is preferably at least 1,1, such as at least 2, preferably at least 3. Mw/Mn is the same as polydispersity index herein. Broader Mw/Mn values are believed to enhance the processability of the materials of the invention.

Mw values are therefore preferably in excess of 100,000, such as at least 125,000. Typically values will preferably not exceed 500,000.

The skilled man will appreciate that PACs can be end capped and the modification step discussed in detail below may involve end capping. It should be noted however, that some PACs may already carry end groups such as esters, e.g. glutarate, adipate, acetate or other end groups which may have their origin during polymerisation, e.g. from cocatalysts present in the polymerisation for Co-salen catalysts.

It will be appreciated that the formation of the PAC may give rise to a well known cyclic carbonate impurity. For example, during the formation of polypropylene carbonate, propylene carbonate may be formed as a by-product. That is the compound

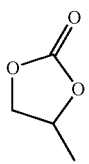

It is common to try to remove this by-product but the present inventors have realised that it acts as a plasticiser and can offer some beneficial properties. It may therefore be necessary to reduce the content of this impurity but not necessarily remove it completely. In some instances it could be beneficial for the end application or for processing that this side product is present. Preferably, the amount of cyclic carbonate impurity in the PAC of the invention (i.e. relative to the weight of the PAC) is less than 10 wt %, preferably less than 7 wt %, e.g. 6 wt % or less, e.g. 1 to 5 wt %. In some embodiments, its content can be reduced to less than 2 wt %, especially less than 1 wt %. In many polymers the amounts of cyclic carbonate impurity are too low to be detected. It is an option however, if there is at least 1 wt % of the carbonate impurity in the PAC, e.g. at least 2 wt %. The carbonate impurity is preferably propylene carbonate but obviously the nature of the impurity depends on the nature of the PAC being formed. When the cyclic carbonate content is low, in some instances, the addition of an alternative plasticizer may be desirable to facilitate melt processing and achieve desired mechanical performance.

PACs suitable for use in the invention can be purchased commercially, e.g. under the trade name QPAC.

It is not uncommon that residues of other small molecules are also present in the PAC used in the inventions, for example epoxide monomer residues or solvent residues. Typically, such volatiles are present in concentrations lower than 1 wt % percent.

Modifying Agent: Anhydrides/Carboxylic Acids

The modifying agent (or modifying compound) of the invention has to comprise at least three carboxylic acid groups or at least one carboxylic acid group and at least one anhydride group or at least two anhydride groups. An anhydride group is taken as representing two carboxylic acids groups herein. It will be appreciated therefore that the anhydrides and carboxylic acids are related compounds. A dianhydride is a disguised tetracarboxylic acid and so on. The term anhydride is used herein to refer to acid anhydrides containing the link —CO—O—CO—

The invention requires modification of the PAC with a compound that comprises at least three carboxylic acid groups or at least one carboxylic acid group and at least one anhydride group or at least two anhydride groups.

Whilst it is possible for the modifying compound to be polymeric such as polymers of acrylic acid, it is preferred if the compound is of low molecular weight, e.g. having a molecular weight of less than 400 g/mol.

Other than the atoms of the carboxylic acid or anhydride functional groups, it is preferred if the modifying agent comprises carbon, hydrogen, nitrogen and oxygen atoms only. In some embodiments, the modifying compound might therefore comprise keto or amide linkages. In other embodiments, the modifying agent might comprise carbon, hydrogen and oxygen atoms only.

The modifying compound preferably comprises a cyclic ring, which can be aliphatic or aromatic, such as a benzene ring, cyclohexane, cyclopentane or cyclobutane. Those rings might be connected to other rings to build more complex structures like in naphthalene, benzophenone, diphenyl ether and similar compounds. The carboxylic acid groups or anhydride groups are preferably attached to those cyclic structures e.g. as a COOH side chain or a —C(O)OC(O)— ring bridging adjacent carbon atoms on the ring.

Preferred modifying agents comprise one or two rings which can be fused or linked covalently by a linking group or a covalent bond. Linking groups are preferably short, such as 1 to 4 atoms in length. Such linkers might therefore be —CO—, —O—, —NR—, —NRCO—, $CH_2$, $CH_2CH_2$, $COCH_2$ or the like, where R is an alkyl group having 1 to 6 carbon atoms.

It is preferred if there is at least one anhydride group present in the modifying compound, preferably two anhydride groups.

Preferred modifying agents are therefore compounds of formula (I)

A(-L-B)n                                       (I)

wherein A is an aryl or aliphatic 4 to 6 membered ring;
L is a linking group of 1 to 4 atoms;
B is an aryl or aliphatic 4 to 6 membered ring; and
n is 0 or 1;
wherein rings A and B in total are substituted with at least three carboxylic acid groups or at least one carboxylic acid group and at least one anhydride group or at least two anhydride groups. It is preferred if no other substituents are present. It will be appreciated that any anhydride group is bonded via the C=O groups of the anhydride to adjacent atoms on the A and/or B rings.

Suitable modifying agents therefore include pyromellitic dianhydride, trimellitic anhydride, mellitic anhydride, benzene tricarboxylic acid, biphenyltetracarboxylic dianhydride (and isomers), naphthalenetetracarboxylic dianhydride (and isomers), benzophenone-tetracarboxylic dianhydride (and isomers) such as benzophenone-3,3',4,4'-tetracarboxylic dianhydride (BPHA), cyclobutane-1,2,3,4-tetracarboxylic dianhydride, perylene-3,4,9,10-tetracarboxylic dianhydride and mixtures thereof. Other dianhydrides of interest are discussed D.-J. Liaw et al./Progress in Polymer Science 37 (2012) 907-974.

The amount of modifying agent added may range from 0.05 to 5 wt % relative to the amount of PAC and modifying agent present in total, preferably 0.1 to 2.5 wt %. It has been found that the addition of too much modifying agent results in degradation of the PAC so it is preferred that no more than 5 wt % of modifying agent is added.

In one embodiment it is preferred if there is more than 0.3 wt % of modifying agent. This makes sure that there is sufficient modifying agent to fully end cap the PAC and modifying agent in excess to take part in other reactions.

Fillers

The invention also relates to the addition of fillers to the modified PACs of the invention. With the addition of fillers, the resulting modified PAC/filler blend is called a composite herein. The presence of fillers can tailor the properties of the PAC further, in particular by improving thermal stability and glass transition temperature. They may also modify mechanical properties, rheology, barrier properties, and importantly, the thermal and electrical conductivity of the polymer. Fillers of interest are generally those which are particulate which would remain in solid form throughout any melt compounding step.

Fillers of interest may be organic or inorganic. Inorganic fillers are typically based on carbon or metal (or semi metal) compound. Fillers of interest include carbon based fillers such as carbon nanotubes (e.g. multiwall nanotubes), graphitic fillers and carbon black. Inorganic fillers are also of interest such as those based on calcium carbonate, talc, layered aluminosilicates (like natural occurring montmorillonite nanoclays (MMT) or synthetic ones like saponite) or tube like aluminosilicates (halloysite), layered double hydroxides (such as hydrotalcite), metal oxides such as (titanium dioxide, zirconium oxide, zinc oxide), boron nitride, mica, polyhedral oligomeric silsesquioxane (POSS) and silica. Inorganic fillers may have mineral or synthetic origin; synthetic ones avoid the occurrence of colouring and degradation frequently originating from minor impurities present in the minerals. Organic fillers might also be used such as those based on cellulose, e.g. microcrystalline cellulose, microfibrillar cellulose or cellulose nanowhiskers.

Surface modification of particles is a common practice to improve the compatibility between the filler and the polymer or can be a result of the fabrication process. The modification may have organic or inorganic nature. Surface modified montmorillonite nanoclays can be purchased commercially as Rockwood Cloisite C30B or Nanomer 1.34TCN. Calcium carbonate is also available with a surface modification, typically fatty acids. Silicas are also available with various surface modifications and POSS fillers can be provided with various organic arms such as those based on esters, hydrocarbyls, alcohols, halides and so on.

In a more preferred embodiment, the filler is based on carbon. These are not organic compounds but rather inorganic carbon based compounds. Carbon based fillers preferably include carbon black, graphene or graphitic fillers (graphene oxide, graphite or graphene nanoparticles) or carbon nanotubes.

Multiwall carbon nanotubes, carbon black and graphite nanoparticles are particularly preferred fillers.

Graphitic fillers of interest are fillers composed of single or multiple layers of graphene or its derivatives. The term graphene refers to a planar sheet of carbon atoms in a honeycomb crystal structure. Derivatives of graphene are those with surface modification. For example, hydrogen atoms can be attached to the graphene surface to form graphane. In order promote exfoliation, graphite in some case is oxidized. The resultant stacks having a few layers of graphene have large diameter to thickness aspect ratio. When a high content of oxygen atoms attached to the surface along with carbon atoms, the filler is called graphene oxide and when the content of oxygen is low the filler might be referred as graphite or graphene nanoparticles. Surface modification is also possible by chemical doping or oxygen/hydrogen plasma treatment by non covalent modification with surfactants or polymers. Covalent surface modification is also commonly performed using defects on the filler surface as anchoring points to graft organic structures.

Other fillers of interest are inorganic oxides of some sort, e.g. simple metal oxides or compounds in which the metal and oxide are further combined with other elements, such as in aluminosilicates.

In a preferred embodiment, the invention targets a composite with enhanced properties such as a nanocomposite. Such nanocomposites may possess transparency. Particle size of the fillers is thus preferably small, i.e. less than 100 microns, preferably less than 30 microns, especially less than 15 microns.

The particle sizes vary with the nature of the filler. It will be appreciated that the filler is not always a spherical particle but can be an anisotropic material such as a platelet or tube. The fillers can therefore be fibre like, plate like or spherical.

Anisotropic fillers may be plates or tubes. Plates may have a thickness of 1 nm to 200 micron and length from 20 nm to 100 microns. Tubes may have a diameter from 1 nm to 500 nm, length from 50 nm to 100 microns.

Isotropic fillers may be spheres or cube like and may have dimensions of 1 nm to 200 microns. This dimensions apply for single particles but particles typically form agglomerates which then have higher sizes than the single particles.

The amount of filler added can vary. Amounts in the range of 0.05 to 70 wt % relative to the total amount of filler and modified PAC are possible, such as 5 to 60 wt %, especially 7.5 to 25 wt %.

It will be appreciated that certain fillers are favoured depending on the target end use of the modified PAC. For example, improvements in rheology, Tg and mechanical properties are especially noticeable using nanoparticulate carbon based fillers such as nanoparticulate graphitic fillers (GNP) or nanoparticulate carbon black (nCB).

Thermal properties can in particular, be improved using calcium carbonate and nanoclay fillers.

Some grades of calcium carbonate, POSS, nanoclays and silica also allow formation of transparent films. It will also be appreciated that for applications where transparency is important, the use of some of the fillers is not favoured at all as these cause a large reduction in transparency and can in fact cause a complete loss of transparency.

For modified PACs destined for electrical applications, the use of a conducting filler is highly preferred. The carbon nanotubes and other carbon based fillers discussed above therefore form an important additive in this regard.

Addition of the Modifying Group and Fillers

There are various options for adding modifying groups and fillers to the PACs of the invention. Fillers can be added after melt compounding with the modifying agent (i.e. the process involves polymerization and work up to get a solid sample, compounding with anhydride and then adding filler and optionally second polymer and other additives). Filler addition in this embodiment is preferably via melt compounding too.

Alternatively, filler is added in a solvent possibly with dispersing aids or with sonication after the modifying agent and PAC are compounded. Fillers might also be added before or simultaneously with the modifying agent and melt compounded.

The modifying agent may be added to the PAC after polymerisation, for example during or after work-up of the polymerisation reaction. Thus, after the polymerisation reaction, preferably when the polymer is still in solution, the modifying agent may be added. It is also possible to add fillers either simultaneously, before or after addition of the modifying agent at this stage. Dispersion of the materials added at this point can be enhanced using surfactants and sonication as dispersion aids.

The crude polymerisation product is preferably milled to form a fine powder. Milling preferably occurs at a low temperature, i.e. less than 0° C. Particle sizes may be 0.05 mm-1 mm. The modifying agent is preferably added after milling.

Typically, the modifying agent and the PAC are melt compounded together. In the compounding process, the PAC and modifying agent are extruded together to blend the materials. The process preferably involves elevated temperature. A benefit of compounding at a higher temperature is a lower melt viscosity which facilitates the dispersion of the anhydride and faster reaction between the modifying agent and PAC.

The temperature should be below the degradation temperature of the PAC in question but above its glass transition temperature. As noted below, it is also possible to combine the PACs with other polymers. When such polymer blends are employed and prepared before the addition of the modifying agent (such that the PAC, additional polymer and modifying agent are all compounded together) higher temperatures may be possible. A preferred compounding temperature, for example, for poly(propylene carbonate) is therefore 120 to 240° C., such as 130 to 160° C., such as about 140° C. Of course, the temperature here will depend on the nature of the PAC and on the melting point of the second polymer and of the relative proportion of components.

The modifying agent can alternatively be added in the presence of a suitable solvent. This solvent compounding method preferably does not involve elevated temperature but rather takes place at ambient temperature. The solvent used is preferably one in which the polymer is soluble and in which the modifying agent is soluble. In the case of PPC and most of the polymers from $CO_2$ and epoxides, suitable solvents include chlorinated hydrocarbons such as dichloromethane, ketones like acetone, esters like propyl acetate or butyl acetate and the epoxide monomer itself.

It should also be noted that solvent might be used in the melt compounding process but typically no solvent is used.

Once the compounding has been completed, the material can be milled, e.g. cryomilled to form a modified polymer powder. Particle sizes may be 0.05 mm-1 mm.

That powder can, if necessary, be mixed with filler. The polymer, with or without filler, can also be granulated or pelletized to be converted into useful items. The polymer pellets (or powder) can then be formed into polymer articles in ways well known to the skilled person, e.g. via extrusion and blowing or casting to form polymer films, injection moulding, blow moulding, compression moulding, thermoforming, extrusion coating, lamination and so on.

As noted above, there are various ways of introducing fillers. Any fillers can be added before the first compounding step (i.e. the compounding step with modifying agent) or possibly after the first compounding step, optionally in a further compounding step. Filler might also be compounded with the PAC along with the modifying agent. It is preferred if fillers are added in a separate step, such as a separate compounding step, after the compounding step with the modification agent.

If fillers are added after the modifying agent compounding step, the PAC in question is already thermally modified. This means that a subsequent compounding step with a filler can be carried out at a higher temperature with a decreased risk of thermal degradation. It is preferred therefore if filler is added after the modification of the PAC with the modifying agent. Moreover, it is preferred if this second compounding step takes place at elevated temperature, such as 120 to 250° C. The modified PAC used for filler addition is preferably milled before that addition.

Once the modifying agent and filler have been added, the blend can be milled once again and then manipulated using the techniques described above into useful articles.

As an alternative to a separate filler compounding step, addition of the filler may take place in a solvent in which the modified polymer is soluble and in the ideal scenario, in which the filler can also be well dispersed. In the case of PPC and most of the polymers from $CO_2$ and epoxides, suitable solvents include chlorinated hydrocarbons such as dichloromethane, ketones like acetone, esters like propyl acetate or butyl acetate and the epoxide monomer itself. In general the solvent must be a good solvent for the modified polymer. The solvent can be carefully selected to achieve simultaneously compatibility with filler, and polymer and to enable easy removal from the polymer, and easy purification for process recycling. The solvent is also preferably low cost and low toxicity amongst other criteria. The solvent may contain one or more types of solvents including water.

This solvent based filler/modifying agent blending process can be carried out at ambient temperature.

It is believed that contacting filler and the modified PAC in a solvent might improve the dispersion of the filler. Good dispersion of filler enhances homogeneity and therefore product consistency. This has particular importance when the PAC is destined for electrical applications and we can achieve electrical conductivity at lower filler contents. Solution compounding also seems to improve oxygen barrier properties in formed films.

It will be appreciated that the filler does not actually dissolve in the solvent but forms a suspension or a fine dispersion therein. The filler dispersion can be aided by the addition of monomeric or polymeric dispersion aids such as surfactants and by the use of stirring of any type or ultrasound. The typical loading of dispersion aid is lower than 2 wt % of solvent.

Surfactants can be classified as ionic (cationic or anionic), and non ionic. The use of single, mixtures of ionic and non ionic, mixtures of anionic, mixtures of cationic or a mixture of one or more non ionic surfactants is preferred; however the mixture of cationic and non ionic or anionic and non ionic ones could also be used.

Examples of cationic surfactants are the quaternary ammonium salts (monomeric) or chitosan (polymeric).

Examples of anionic surfactants are alkyl benzene sulfonates, copolymers of acrylic and methacrylic acid, sulfonated ethoxylates of alkyl or aryl compounds and sulfonated ethoxylates of alkyl or aryl compounds.

Examples of non ionic surfactants are esters of glycerol or glycol, copolymers of esters of acrylic acid, ethoxylates of fatty acids, and ethoxylates of amides. The most preferred ones are the ethoxylates of fatty acids and the ethoxylates of amides having the following structures:

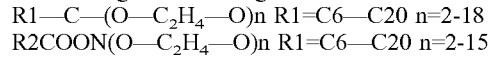

Properties of the Modified PACs

The modified PAC's of the invention can be manipulated in various ways depending upon the desired end result, e.g. by changing the amount and nature of modifying agent used or by changing the loading and nature of any filler present As noted above the method of combining the modified polymer and filler may also affect properties.

The use of the modifying agents of the invention can increase the thermal degradation temperature T|5% (measured using TGA 10° C./min in $N_2$) by at least 5% relative to the unmodified polymer. Alternatively, use of the modifying agents of the invention can increase the thermal degradation temperature (T|5%) by at least 5° C., such as at least 10° C. In the context of PPC, the value of T|5% may be at least 235° C. The use of the modifying agents of the invention improves the thermal degradation properties of the material relative to the use of maleic anhydride, e.g. by a few degrees C., such as at least 2° C.

Glass transition temperatures are preferably increased by 1 to 3° C. or at least not significantly reduced relative to the unmodified PAC.

The present inventors have noted that above a certain level of acidity or causticity in the filler, it may partially degrade the polymer. Some GNPs and oxidized nanotubes which carry over acid residues remaining from their fabrication or nanotubes that are surface modified can cause degradation. Also, the addition of more than 30 wt % calcium carbonate can cause degradation due to the excess alkalinity intrinsic in the filler.

This may facilitate the dispersion of the filler by decreasing the melt viscosity. Where the material is an electrical conductor dispersion is very important so this approach could be used to control the material properties when target materials are electric conductors.

Acidity could be even added on purpose in the form of latent acids to trigger degradation during melt compounding. Such acids might be ammonium salts of inorganic acids (ammonium nitrate, phosphate, sulfate), ammonium carboxylates (acetate formiate, benzoate, citrate, maleate), or ammonium salts of sulfonic acids, also those activated after UV irradiation.

Modification of the PACs following the teaching of the invention leads to reduced melt viscosity and improved optical properties. It has been found that the modified PACs of the invention absorb UV radiation, especially UVB and UVC radiation. This obviously stabilises the PAC for everyday use and may reduce or remove the need for specific UV stabilising additives to be present.

The UV spectrum comprises radiation with wavelengths below the visible and above X-rays. (400 nm to 100 nm). The UV spectrum can be split into three intervals UVA (400 nm to 315 nm), UVB (315 nm to 280 nm) and UVC (280 nm to 100 nm). UVC light is mostly screened in the atmosphere but with thinning ozone, UVC radiation is becoming more of an issue. UVB radiation is a free radical generator and hence a potential source for polymer degradation. This can often be seen in plastics in terms of a yellow colour and loss of mechanical properties. Plastics are thus provided with UV stabilisers to prevent degradation. It has been found that modified PACs of the invention have excellent UVB and UVC absorption inherently.

It has been found that the addition of maleic anhydride to PACs causes discolouration of a PAC film. In general, polymer films need to be colourless and transparent and the addition of maleic anhydride is a problem in that regard. The use of the modifying agents of the present invention, in some instances minimises colour change.

The modified PACs of the invention also exhibit improved stiffness compared to polymers using maleic anhydride. E modulus values are generally higher, in particular at higher modifying agent amounts. Also, the stiffness of PACs modified with maleic anhydride decreases more than those modified with modifying agents of the invention as temperatures increases. This decrease is very marked for maleic anhydride modified PACs but is much less marked for modified PACs of the invention. The inventive compositions therefore offer improved stiffness over a broad range of temperatures.

The compositions of the invention may therefore possess E' (storage modulus as measured by DMA) values of at least 800 MPa, such as at least 1000 MPa (at 20° C.).

It will be appreciated that during a compounding step, there exists the possibility of chain scission and hence a reduction in molecular weight. Using the modifying agents of the invention this effect can be mitigated.

Despite however the Mw and Mw/Mn remaining similar, rheologically the PACs of the invention are different from their non modified precursors. We observe a reduction in complex viscosity both at high and low shear. This decrease is also proportional to the amount of modifying agent added. A decrease in complex viscosity (without substantial loss of Mw) is advantageous as this leads to easier processability (in terms of extrusion) without loss of mechanical properties. Without wishing to be limited by theory, it is envisaged that any chains which are broken during the compounding step are able to react with the modifying agent and form coupled chains once again. As there are multiple reaction points on the modifying agents of the invention the presence of branched structures may occur.

When fillers are additionally present, further improvements in PAC behaviour can be observed. It will be appreciated, however, that the addition of fillers tends increase haze and can cause the formation of opaque films.

The introduction of fillers is particularly useful in improving oxygen barrier properties. In particular, the use of clays or carbon based fillers reduces the permeability of the compositions of the invention to oxygen.

The introduction of clays also seems to increase thermal degradation temperature still further, perhaps by 5° C. or more over the modified PAC.

It will also be appreciated that where a second compounding step is employed for introducing the filler there is a second opportunity for chain scission and Mw reduction. Clays appear to mitigate that reaction.

Carbon based fillers such as nano carbon black are very efficient as rheological modifiers When increasing the loading carbon based fillers massively increased the shear thinning ratio and also the resin becomes electrically conductive in the vicinity of 10 wt % carbon based filler.

Graphitic nanoparticles are efficient in increasing Tg, the rigidity of the resins and also mitigating the softening around room conditions and in the mitigation of the molecular weight drop of polymers.

A particularly preferred option is the manufacture of electrically conducting materials. This can be achieved after the addition of conductive fillers such as graphitic fillers, carbon black and multiwalled nanotubes. The addition of these fillers also allows the formation of antistatic materials. As filler contents increase materials firstly act as anti-static materials before becoming electrical conductive at higher filler levels.

The use of fillers therefore allows tailoring of polymer properties to suit desired goals.

Other Polymers

It will be appreciated that the compositions of the invention may additionally comprise other polymer components ideally of higher stiffness (measured from the tensile modulus), for example higher than 50 MPa, more preferably higher than 200 MPa and especially those with modulus higher than 600 MPa. Such a polymer may be amorphous (fluid/liquid), crystalline or partially crystalline at room temperature. Preferably, such other polymer components have at least 40% crystallinity at room temperature. Preferably, such a polymer has a melting point between 100 and 220° C., more preferably between 120 and 200° C.

The addition of other polymer components such as polyolefins (e.g. polyethylenes, polypropylenes), polyvinylchlorides, polyethylene terephthalates, polystyrene, polylactic acids, polyhydroxy acids (PHAs), polyhydroxyalkanoates (i.e. PHB) as well as natural polymers such as starch or modified starches is possible. Further options include Boltorn H30 which is a dendrimeric polymer provided by Perstorp. It is hyper-branched and is terminated by hydroxyl groups. The use therefore of dendrimers is also envisaged. Mixtures may also be used.

It is particularly preferred if a polyolefin or polylactic acid is employed as the additional polymer component. That polyolefin is ideally a polyethylene or polypropylene.

The addition of a second polymer mainly provides mechanical reinforcement. The introduction of a second polymer with higher heat deflection temperature (HDT) than the PAC also increases the HDT for the blend.

Also, in some instances stiffness is necessary to minimize warpage, e.g. where a material is used in injection moulding. If the polymer does not possess sufficient stiffness to counteract the internal stress accumulated during high shear processing, the molded article will warp. A second polymer component can be used to increase stiffness, such as PLA, PHA or starch.

A second polymer can also be a fluoroelastomer as defined below. It will be appreciated that a mixture of additional polymers might be present such as a fluoroelastomer and a polyolefin and so on.

The amount of second polymer added may be in the range of 1 to 75 wt %, such as 20 to 60 wt %.

Where a second polymer, e.g. a polyolefin is combined with the PAC, that blend may also contain a compatibiliser. This component enables the formation of a homogeneous blend between the polar PAC and the non polar polyolefin such as polyethylene. The nature of the compatibiliser can therefore vary widely as long as the material is capable of providing the desired homogeneous blend with desirable end properties. Compatibilizers can be also added to improve the filler dispersion or added as carriers when particle masterbatches are used.

The present inventors have found that the best results are obtained when the compatibiliser is at least one ethylene alkyl (meth)acrylate resin (EAA). The term (meth)acrylate is intended to cover both methacrylates and acrylates, i.e. compounds of formula $CH_3$—$CH_2$═CHCOO— or $CH_2$═CHCOO—. The (meth) designates therefore the optional presence of the methyl group forming the methacrylate. It is preferred, however, if the EAA of the invention is an acrylate.

The term "alkyl" is used to designate a $C_{1-6}$ alkyl, preferably a $C_{1-4}$ alkyl. Preferably the EAA may be a poly ethylene methyl (meth)acrylate, ethylene ethyl (meth)acrylate or ethylene butyl (meth)acrylate resin, especially ethylene methyl acrylate, ethylene ethyl acrylate or ethylene butyl acrylate resin (EMA, EEA and EBA respectively). Whilst mixtures of these resins can be used, it is preferred if only one EAA is used. Most preferably this is EMA.

The amount of (meth)acrylate (relative to the amount of ethylene) in the EAA resin can vary over wide limits. It is preferred if there is an excess of ethylene present. Typical values range from 15 to 40 wt % of the acrylate, such as 15 to 35 wt % of the acrylate in the EAA polymer.

The density of the ethylene alkyl (meth)acrylate resin may be in the range of 935 to 960 kg/m$^3$. Its $MFR_2$/190° C. may range from 0.1 to 20 g/10 min.

These EAA polymers are commercially available materials and can be purchased from various suppliers, e.g. under the trade name Elvaloy™.

It will be appreciated that a mix of compatibilisers can be used. The additional polymer component can be added before the PAC is compounded with the modifying agent or the second polymer can be added after the PAC is modified.

The fluoroelastomer useful in the compositions of this invention include amorphous fluoropolymers and thermoplastic fluoropolymers (i.e. semi-crystalline fluoropolymers). Fluoroelastomers useful in this invention are fluoropolymers that are normally in the fluid state at room temperature, i.e. 25° C. and above, i.e. fluoropolymers which have Tg values below room temperature and which exhibit little or no crystallinity at room temperature. It is preferred, but not essential, to employ fluoroelastomers having a fluorine to hydrogen ratio of at least 1:1. The fluorine content of the most preferred fluoroelastomers varies between 50 and 80 wt %.

Fluorinated monomers which may be copolymerized to yield suitable fluoroelastomers include vinylidene fluoride, hexafluoropropylene, chlorotrifluoroethylene, tetrafluoroethylene and perfluoroalkyl perfluorovinyl ethers (such as perfluoromethylvinylether). Specific examples of the fluoroelastomers which may be employed include copolymers of vinylidene fluoride and a comonomer selected from hexafluoropropylene, chlorotrifluoroethylene, 1-hydropentafluoropropylene, and 2-hydropentafluoropropylene; copolymers of vinylidene fluoride, tetrafluoroethylene, and hexafluoropropylene or 1- or 2-hydropentafluoropropylene; and copolymers of tetrafluoroethylene, propylene and, optionally, vinylidene fluoride, all of which are known in the art.

In some cases these copolymers may also include bromine-containing comonomers as taught in Apotheker and Krusic, U.S. Pat. No. 4,035,565, or terminal iodo-groups, as taught in U.S. Pat. No. 4,243,770. The latter patent also discloses the use of iodo group-containing fluoroolefin comonomers. When fluorinated monomers are present in these copolymers in certain molar ratios, the glass transition temperature of the polymer is near or below 0° C., and the compositions are useful elastomers that are readily available articles of commerce.

Semi-crystalline fluoropolymers which may be used in the invention include, but are not limited to poly(vinylidene fluoride), homopolymers and copolymers of tetrafluoroethylene (such as Teflon® FEP fluorocarbon resin, and copolymers of tetrafluoroethylene, propylene and, optionally, vinylidene fluoride).

Multimodal fluoropolymers, such as those disclosed in International Patent Publication WO 00/69967, may also be employed as the fluoropolymer in the compositions of this invention. By "multimodal" is meant that the fluoropolymer has at least two components of discrete and different molecular weights. Both components may be amorphous or semi-crystalline, or one component may be amorphous and another component semi-crystalline.

These polymers are commercial products and are available under the trade name Viton free flow from DuPont. Of particular interest are dipolymers of vinylidene fluoride and hexafluoropropylene (sold as Viton A and Tecnoflon), terpolymers of vinylidene fluoride and hexafluoropropylene and tetrafluoroethylene (sold as Viton B, Viton F and Tecnoflon). It will be appreciated that these commercial products may contain adjuvants in addition to the fluoroelastomer.

In order to minimise the possibility of causing transparency issues, it is preferred if the particle size of the fluoroelastomer is 10 microns or less, such as 2 to 10 microns.

The amount of fluoroelastomer present may range from 0.01 to 5 wt % of the blend in which it is present, such as 0.1 to 3 wt %, preferably 0.25 to 2 wt %. If necessary the fluoroelastomer may be added as a masterbatch as is well known in the art. Thus a higher percentage of fluoroelastomer may be added to a small amount of polycarbonate which we blended with polycarbonate which is fluoroelastomer free results in a fluoroelastomer content in the range above.

Addition of fluoroelastomer can take place before or after the PAC is modified with the modifying agent.

In a particularly preferred embodiment, the use of both a fluorelastomer and additional polymer such as a polyolefin or polylactic acid is envisaged. The fluoroelastomer might be present in amounts of 1 to 5 wt %. The second polymer might be present in amounts of 1 to 60 wt %.

Additives

The PACs of the invention are susceptible to degradation, e.g. via break down of the carbonate linkages in the backbone of the polymer. In order to prevent degradation of the PACs, various additives can be added as is well known in the art both as processing aids and to extend the polymer properties in the final application. Anti-oxidants and, if necessary UV stabilizers, may be added to the composition, for example. Thus, either or both of these additives can be present, preferably both. Depending on the use of the PAC other standard polymer additives may also be present such as nucleating agents, clarifiers, anti-blocking agents, slip agents, processing lubricants, plasticisers, pigments, dyes, foaming agents and so on.

The anti-oxidant concentration may be in the range of 0.05-1.5 wt % in the film.

The UV stabilizer concentration may be present in the range of 0.05 to 2.0 wt %.

The total concentration of UV stabilizer and anti-oxidants within the compounds is preferably 3 wt % or less. More preferably, the total content of all additives present is 3 wt % of less.

The anti-oxidant is preferably a phenolic antioxidant. Preferred phenolic antioxidants are [Octadecyl 3-(3',5'-di-tert. butyl-4-hydroxyphenyl)propionate] (e.g. Irganox 1076) or [Pentaerythrityl-tetrakis(3-(3',5'-di-tert. butyl-4-hydroxyphenyl)-propionate] (e.g. Irganox 1010). It is more preferred if the anti-oxidant is a tocopherol or derivative thereof, in particular vitamin E. Further options include, i.e. Boltorn H30 which is a dendrimeric polymer provided by Perstorp. It is hyper-branched and is terminated by hydroxyl groups. The use therefore of dendrimers is also envisaged.

A further option is the use of organic phosphite or phosphonite antioxidants preferably [Bis(2-methyl-4,6-bis (1,1-dimethylethyl)phenyl)phosphorous acid ethylester] (e.g. Irgafos 38), [Tris(2,4-di-t-butylphenyl)phosphite] (e.g. Irgafos 168), tris-nonylphenyl phosphate, [Tetrakis-(2,4-di-t-butylphenyl)-4,4'-biphenylen-di-phosphonite] (e.g. Irgafos P-EPQ) or [Phosphorous acid-cyclic butylethyl propandiol, 2,4,6-tri-t-butylphenyl ester] (e.g. Ultranox 641).

It may be possible to use a mixture of anti-oxidants.

It is also possible if a UV stabiliser is used instead of or preferably as well as the anti-oxidant. The at least one UV-stabiliser may be selected from [1,6-Hexanediamine, N,N'-bis(2,2,6,6-tetramethyl-4-piperidinyl)-, polymer with 2,4,6-trichloro-1,3,5-triazine, reaction products with, N-butyl-1-butanamine and N-butyl-2,2,6,6-tetramethyl-4-piperidinamine] (e.g. Chimassorb 2020), [Poly((6-morpholino-s-triazine-2,4-diyl)(2,2,6,6-tetramethyl-4 piperidyl)imino) hexamethylene (2,2,6,6-tetramethyl-4-piperidyl)imino))] (e.g. Cyasorb UV 3346); [Poly((6-((1,1,3,3-tetramethylbutyl)amino)-1,3,5-triazine-2,4-diyl)(2,2,6,6-tetramethyl-4-piperidyl)imino)-1,6-hexanediyl((2,2,6,6-tetramethyl-4-piperidyl)imino))] (e.g. Chimassorb 944); or 2-hydroxy-4-n-octoxy-benzophenone.

In some applications the mechanical performance requires a low glass transition temperature. This can be achieved by increasing the content of propylene carbonate as has been described previously since propylene carbonate acts as a plasticizer. Alternatively to propylene carbonate other plasticizer types can be added to the formulations. Applicable plasticizers are phthalates (didecyl, dinonyl, dioctyl, dihexyl, dibutyl and iso oligomers), citrates (tri, di or mono butyl, pentyl, hexyl, heptyl, octyl and iso isomers), maleates (dibutyl, pentyl, hexyl and iso isomers), trimellitates (didecyl, dinonyl, dioctyl, dihexyl, dibutyl and iso oligomers and the combination of two length for the alkyl chain), polyester oligomers with Mn<10000 (diacids from C2-C8, diols from C2-to C8), epoxidized unsaturated vegetable oils, polyethers (polymers or copolymers of propylene and ethylene oxide). The level in the composition depends on the desired mechanical properties and may range between 0.1 wt % to 40 wt % related to the amount of PAC, more typically in the 1-10 wt %.

Applications

The modified PAC's produced by the process of the invention are suitable for use in a variety of applications, e.g. as circuits for electronics, foams (packaging, infrastructure (including insulations, jackets and semiconductive compounds in cables), mechanical/thermal/acoustic insulation), appliances, infrastructure, food packaging, household goods or enhanced oil recovery.

More specifically, they might be used in moulding applications or for film forming or in lamination. It is also possible to foam the modified PACs of the invention, perhaps to make aerogels, household products and cases for appliances. Foamed materials might therefore have applications in the building industry or as lightweight packaging, e.g. for electronic goods.

In particular, they are well suited for use in the preparation of articles such as bottles, containers, films and laminates. These articles can be also foamed.

Alternatively, they could be utilised in circuit boards as sacrifice polymers, as electrically or thermally conductive plastics or adhesives. When foamed, the modified PACs can act as heat, mechanical and/or acoustic insulation. They could also be used as gel polymer electrolytes for lithium-ion batteries. Alternatively these could also be used in oil drilling and production for enhanced oil recovery or $CO_2$ sequestration or storage in geological formations. In cable applications they can also be used as semiconductive or electrically conductive materials.

The modified materials of the invention might be coated onto substrates such as plastics, metals, textiles, ceramics, cardboard and paper. The use of the modified PACs of the invention to coat paper substrates is particularly preferred. Using lamination techniques or extrusion coatings techniques, such coated paper substrates may have utility in the formation of packaging for food and beverages and the like.

The invention will now be described with reference to the following non limiting examples.

Analytical Methods:

GPC (Molecular Weight and Molecular Weight Distribution, Mw and MWD): The molecular-weight distribution was determined by size-exclusion chromatography (SEC) in an Agilent PL-GPC 50 equipped with a refractive index detector and calibrated with narrow polystyrene standards. The determinations were performed in THF as the eluent at 40° C. It was used a sample preparation system PL-SP260VS with 1μ glass fiber filter to remove the particles in suspension from composite samples.

Tensile Properties: measured on compression moulded or injection moulded specimens (ISO 293-1986, 1872-2-1997, 1873-2-1997, 150° C., pressure intervals of 25-90-165-165-165 bar) according to ISO527-1/2.

TGA (Onset of Decomposition): Thermogravimetric analysis thermograms were recorded in a TGA Q500 instrument from TA Instruments in accordance to ISO 11358, using 3 mm diameter disks approximately of 10 mg, cut from hot pressed plates 1 mm thick. Constant flow of $N_2$ was used during 5 min purging period and during the analysis. TGA runs were recorded over a temperature interval of 25-425° C. using a heating rate of 10° C./min.

DMTA: E' and Tg

Dynamic mechanical thermal analysis characterizations were performed in a DMA Q800 from TA Instruments using a single-cantilever fixture. Storage and loss moduli, E' and E", were measured within the linear viscoelastic range. The values of E' are reported at 20 and 30° C. as E'|20, E'|30. The glass transition temperature was quantified from the maximum of the tan δ curve. The scanned interval was −5 to 70° C. using a dynamic strain of 0.01% and a frequency of 1 Hz; the test specimens were 2 mm×5 mm×25 mm strips cut from hot-pressed films at 150° C.

Rheology: Shear storage, loss modulus and complex viscosity, G', G", η* (complex viscosity or ETA), were measured within the linear viscoelastic range. The values at low and high frequency are reported (η*|0.1,η*|10). The instrument used is a Rheometrics Scientific RDA II Analyzer, equipped with parallel plate geometry (diameter 25 mm), on hot pressed specimens (diameter 25 mm). Preheating time of 200 s was used. Frequency sweeps were run in the interval 0.06 to 15.85 rad/s for isothermal/isostrain measurements at 140° C./10% was used.

UV-VIS Spectrometry: Transmittance UV-VIS spectra were recorded on 2mmthick specimens in a calibrated Shimatzu UV-VIS spectrometer. Colour was evaluated as the transmittance at 580 nm Polypropylene carbonate (PPC) is used in the examples of the invention and is purchased under the trade name QPAC40: The main characteristics of the PPC are given in table 1.

TABLE 1

Main characteristics of the PPC

| Batch | MW [g/mol] | Cyclic carbonate* content [%] | Ether content [%] | $T_g$ [° C.] from DMA |
|---|---|---|---|---|
| QPAC40 | 285,000 | 4.2 | <8 | 28 |

*propylene carbonate

EXAMPLE 1

Compounding was performed in a Prism 16 extruder using a standard screw configuration and 140° C. as compounding temperature. The uncompounded starting material Qpac40 was used as reference.

Samples in table 2 are prepared by the addition of pyromellitic anhydride (PA) or maleic anhydride (MA) (comparative) from 0.1 wt % to 3 wt % on Qpac40. The polymer was then tested following the protocols outlined above in the analytical tests section. The results for PPC are presented in Table 3.

TABLE 2

| Sample | Matrix | Sample Name | PA Wt % | MA Wt % |
|---|---|---|---|---|
| 0 | PPC | PPC | | |
| 1 | PPC | PPC-PA-0,1 | 0.1% | |
| 2 | PPC | PPC-PA-0,5 | 0.5% | |
| 3 | PPC | PPC-PA-1,0 | 1.0% | |
| 4 | PPC | PPC-PA-3,0 | 3.0% | |
| 5 | PPC | PPC-MA-0,1 | | 0.1% |
| 6 | PPC | PPC-MA-0,5 | | 0.5% |
| 7 | PPC | PPC-MA-1,0 | | 1.0% |
| 8 | PPC | PPC-MA-3,0 | | 3.0% |

TABLE 3

| | Sample | 3 | 7 |
|---|---|---|---|
| | Composition | PPC-PA-1,0 | PPC-MA-1,0 |
| TGA | T 5% ° C. | 252 | 246 |
| | T onset(I) ° C. | 271 | 259 |
| DMA | E\20 MPa | 1305 | 774 |
| DMA | E\30 MPa | 32.0 | 21.0 |

EXAMPLE 2

Optical Properties

Unmodified PPC is typically a colourless, transparent polymer. After the melt modification with MA and PA the resin becomes coloured. The colouring is more intense in the MA treatment than with PA The modification with a 3 wt % PA has approximately the same colour value as the treatment with the lowest addition of MA treatment 0.1 wt %. These results are presented in table 4 with the photometrically measured colour given.

TABLE 4

| Sample | Matrix | Colour |
|---|---|---|
| 1 | PPC-PA 0.1 wt % | 1.1 |
| 2 | PPC-PA 0.5 wt % | 1.1 |
| 3 | PPC-PA 1.0 wt % | 1.3 |
| 4 | PPC-PA 3.0 wt % | 1.5 |
| 5 | PPC-MA 0.1 wt % | 1.4 |
| 6 | PPC-MA 0.5 wt % | 2.2 |
| 7 | PPC-MA 1.0 wt % | 2.9 |
| 8 | PPC-MA 3.0 wt % | 5.1 |

UV Properties:

In the visible range, variations in color as seen by 580 nm match well with the sensitive evaluation from table 4, in which MA colours the PPC resin to a larger extent than with PA for the same addition.

When it comes to the UV interval, MA partially absorbs the UVA and in higher proportions the UVB and UVC proportionally to its loading. In contrast the PA modified samples selectively, from approximately 325 nm, and efficiently absorb the UVB and UVC from the lowest addition level of the anhydride (0.1 wt % PA).

Thermal Analysis

Thermal stability is enhanced by the addition of PA. The improvement is higher for the PA modified samples than those modified with MA.

Rheology

The complex viscosity parameters show a decrease both at high and low shear by the increase of the anhydride loading. This contrast suggests that a simultaneous process of chain scission/chain coupling may occur during the modification with PA and MA changing the architecture of the polymer chains in a configuration that decreases the viscosity of the melt both at high and low shear. This effect is useful since low viscosity allows an easier processing of neat resins and also facilitates the dispersion of fillers.

Stiffness

In general, PA samples are stiffer than those from MA when evaluated at 20° C. Similar trends are also found in the stiffness evaluated at 30° C. The reinforcing effect may be explained by branching facilitated by PA. This effect can not be achieved by MA since only linear structures can be formed after the treatment with this anhydride.

It is also interesting that the modification of the stiffness has an effect when comparing the stiffness at 20 and 30° C. The ratio E'|20/E'|30 can be understood as a softening ratio and shows that between 20 and 30° C. the stiffness is approximately 4 times lower at 30° C. than at 20° C. for the unmodified Qpac40. In contrast the stiffness of the sample modified with a 1% PA is only 1.6 times lower at 30° C. than at 20° C. This effect is useful taking into account that the variation between 20 and 30° C. are typical temperature variations of room conditions and this modification could help in dampening the variation of the mechanical properties around these temperature conditions.

EXAMPLE 3

Samples were prepared by melt compounding in two steps; 1) PA modification and 2) dispersion of filler in the matrix. In the first step, the melt modification with 1 wt % PA is conducted in a Prism 24 extruder with standard configuration at 140° C. to produce at least 6 kg of PPC-PA. The large batch of PPC-PA is cryo-milled and split in 300 g batches. The PPC-PA powder was hand mixed with the corresponding amount of filler and subsequently fed to the Prism 16 extruder with standard configuration. The compounding temperature for most of the samples was 140° C. but for few cases the compounding was also done at 200° C. Typically, 150-200 g were recovered from the compounder.

Fillers were commercial grades of nanosized calcium carbonate, carbon black, oxidized multiwall carbon nanotubes, graphene nanoplatelets, surface modified montmorillonite nanoclays of various grades as described in Table 5.

TABLE 5

| Reinforcement | Manufacturer | Grad | Description | Pretreatment |
|---|---|---|---|---|
| nCC 1 | Solvay | Socal 31 | Nanosized uncoated CaCO3 | |
| nCC 2 | Solvay | Socal 312 | Nanosized stearate coated CaCO3 | |
| CB | Columbia | PFEB | Nanosized carbon black | Milling |
| CNT 2 | Nanocyl | NC3101 | Oxidized MWCNT | |
| MCC | SigmaAldrich | 435236 | Microcrystalline Cellulose | Milling |
| MMT1 | Nanocor | Nanomer 1,34TCN | OM1MMt | |
| MMT2 | Rockwood | Cloisite C30B | OM2MMT | |
| GNP 2 | XG Sciences | GNP M25 | Graphite NP 25 micron 6-8 nm | |
| GNP3 | XG Sciences | GNP C300 | Graphite NP 1-2 micron 6-8 nm | |

The compounded blends are shown in table 6.

TABLE 6

| Sample # | Matrix (1 wt % PA) | Filler | Comp T (° C.) | Filler Wt % |
|---|---|---|---|---|
| 0 | PPC | | | |
| 17 | PPC-PA | | 140 | |
| 18 | PPC-PA | nCC1 | 140 | 3% |
| 19 | PPC-PA | nCC2 | 140 | 3% |
| 20 | PPC-PA | nCB | 140 | 3% |
| 21 | PPC-PA | CNT2 | 140 | 3% |
| 22 | PPC-PA | MCC | 140 | 3% |
| 23 | PPC-PA | MMT1 | 140 | 3% |
| 24 | PPC-PA | MMT2 | 140 | 3% |
| 25 | PPC-PA | GNP 2 | 140 | 3% |
| 26 | PPC-PA | MMT1 | 200 | 3% |
| 27 | PPC-PA | MMT2 | 200 | 3% |
| 28 | PPC-PA | GNP 2 | 200 | 3% |

In table 7 different fillers amounts were used.

TABLE 7

| Sample | Matrix | Sample Code | Filler | Comp T (° C.) | Filler Wt % |
|---|---|---|---|---|---|
| 30 | PPC-PA-1,0 | PPC-PA-1,0 | | 140 | 0.0% |
| 31 | PPC-PA-1,0 | PPC-PA-1,0-gnp2- | GNP2 | 140 | 10.0% |

TABLE 7-continued

| Sample | Matrix | Sample Code | Filler | Comp T (° C.) | Filler Wt % |
|---|---|---|---|---|---|
| 32 | PPC-PA-1,0 | 10% PPC-PA-1,0-gnp2-15% | GNP2 | 140 | 15.0% |
| 33 | PPC-PA-1,0 | PPC-PA-1,0-nCB-10% | nCB | 140 | 10.0% |
| 34 | PPC-PA-1,0 | PPC-PA-1,0-nCB-15% | nCB | 140 | 15.0% |

The results are presented in table 8 and 9

TABLE 8

| | Sample # | 17 | 18 | 19 | 20 | 21 | 22 | 23 | 24 | 25 |
|---|---|---|---|---|---|---|---|---|---|---|
| | Sample code | PPC-PA | PPC-PA-nCC1 | PPC-PA-nCC2 | PPC-PA-nCB | PPC-PA-CNT2 | PPC-PA-MCC | PPC-PA-MMT1 | PPC-PA-MMT2 | PPC-PA-GNP2 |
| | Reinforcement | | nCC1 | nCC2 | CB | CNT 2 | MFC | MMT1 | MMT2 | GNP 2 |
| | CompT (° C.) | 140 | 140 | 140 | 140 | 140 | 140 | 140 | 140 | 140 |
| TGA | T 5% ... ° C. | 261 | 266 | 265 | 267 | 263 | 260 | 270 | 272 | 263 |
| | % Wt loss | 60 min @200° C. | 6.7 | 4.1 | 4.1 | 4.9 | 4.8 | 7 | 4.3 | 4.6 | 5.8 |
| RDA | Eta*| 10 ... Pa · s | 7300 | 8939 | 9449 | 7967 | 9686 | 8011 | 9434 | 9190 | 8298 |
| DMA | E'|20 ... MPa | 2700 | — | 2800 | 3200 | 2800 | 2800 | 2800 | 2800 | 3100 |

TABLE 9

| | Sample | 17 | 26 | 27 |
|---|---|---|---|---|
| | Composition | PPC-PA | PPC-PA-MMT13% | PPC-PA-MMT2 |
| | Reinforcement | | MMT1 | MMT2 |
| | Compounding T (° C.) | 140 | 200 | 200 |
| TGA | T 5% ... ° C. | 261 | 270 | 272 |
| | % Wt loss | 60 min @200° C. | 6.7 | 4.4 | 4.3 |
| RDA | Eta*| 10 ... Pa · s | 7300 | 8780 | 8053 |
| DMA | E'|20 ... MPa | 2700 | 3100 | 2800 | the resin since major molecular weight losses are not seen after comparing the composites with the unfilled samples. The sample prepared with nCC1 did not display any drop in the molecular weight.

Regarding the stiffness as measured by E'|20 and softening ratio between 20 and 30° C. (E'|20/E'|30) fillers like nCB and GNP2 seem to be efficient in increasing the stiffness and decreasing the softening after small oscillations of temperature around room conditions. For this reason nCB and GNP2 are studied at higher addition level.

For the CNTs it can be seen that they improve the thermal stability as measured by T|5% and contribute to the electrical conductivity as will be shown in the example 4.

The results at 200° C. show that compounding can even be carried out at 200° C. with some losses in molecular weight, however preserving and even slightly increasing the stiffness and Tg.

At higher filler loadings, the following results were obtained:

TABLE 10

| | Sample | PPC | PPC-PA-1,0 | PPC-PA-1,0-GNP2-10% | PPC-PA-1,0-GNP2-15% | PPC-PA-1,0-nCB-10% | PPC-PA-1,0-nCB-15% |
|---|---|---|---|---|---|---|---|
| TGA | T 5% ... ° C. | 229 | 252 | 254 | 254 | 260 | 264 |
| | Tonset(i) ... ° C. | 242 | 271 | 290 | 289 | 278 | 278 |
| RDA | Eta*| 10 ... Pa · s | 5.6E+03 | 5.4E+03 | 9.2E+03 | 1.2E+04 | 7.7E+03 | 1.1E+04 |
| DMA | Tg ... ° C. | 28 | 29 | 34 | 38 | 30 | 31 |
| | E'|20 ... MPa | 775 | 1305 | 2379.0 | 3600.0 | 1643.0 | 1903.0 |
| Electrical Conductivity | κ (S/cm) | Ins or SC | Ins or SC | 2.71E−07 | 3.72E−03 | 1.21E−05 | 3.92E−03 |

SC semiconductive,
Ins is insulator

Characterization of 3 wt % Filled Samples Compounded at 140° C.

The thermal stability of the samples can be judged from the dynamic or isothermal TGA characterizations. It is observed that there is an increase in the thermal stability for all the samples compared to the initial PPC. The largest enhancement is seen in samples prepared with MMT1 and MMT2 as seen from T|5%, and of nCC1 and nCC2 as seen from % loss at 200° C. after 60 min.

The characterization of the molecular weight shows that the main losses in molecular weight occur during the first compounding with PA, while in the second extrusion (after the addition of fillers) the PA modification seem to stabilize At high filing level, nCB containing samples display a high thermal stability.

The rheology analyses show a strong increase in the viscosity both at low and high shear in which the nCB samples have a significantly higher increase not only in the viscosity values but also in the shear thinning index (ratio between the complex viscosity at low and high shear). The increase in the viscosity improves the dimensional stability of samples during de-molding in injection molding or blow molding processing.

The addition of high levels of filler enhances the stiffness, softening ratio and Tg. In terms of all the three parameters GNP2 has an outstanding behavior. At 15 wt %, compared to PPC-PA it increases the stiffness in a 276% at 20° C. and outstandingly in a 5400% at 30° C. Using PPC-PA as reference, at 15 wt % loading GNP2 increases Tg in 10° C.

1.0 E-03 S/cm is the limit between semi-conductive and conductive materials (electrical conductivity). For GNP2 and nCB the samples are conductive at the 15 wt % level of filler addition.

EXAMPLE 4

Solution Blending

Oxidized carbon nanotubes (0.3 g) were dispersed in 100 ml of tetrahydrofuran (THF) with 0.5 wt % of Luthensol FSA10 (an ethoxylate of a fatty amide) with the of sonication in a Branson 2510/40 Khz/80 W bath during 3 h. The temperature was maintained below 45° C. 18 g of QPAC 40 melt modified with 1% of pyromellitic anhydride (as in the example 3, table 11) was added to the dispersion of nanotubes in THF and sonicated for six more hours maintaining the bath temperature below 45° C. The sample was transferred to a 1 l vessel with mechanical stirring, 80 ml of THF was added. The mixture was stirred at 500 rpm during 1 h, then the stirrer speed was increased to 700 rpm and 800 ml of methanol was added. The composite instantaneously forms a second phase which precipitates overnight as cake. The composite with a high content of solvent was recovered from the liquid phase and dried for 24 h at 60° C. and then for 72 h at 30° C. under the flow of nitrogen.

Plates 2×5×25 mm were hot pressed at 150° C. from the previously described composite prepared by solution blending and sample 21 table 9 with the same polymer matrix and level of carbon nanotubes were tested for resistance using a multimeter at 12V. The sample prepared by solution compounding was electrically conductive (conductivity >1 E-3 S/cm) while the sample prepared by melt compounding is not conductive. This fact reflects the better dispersion that is commonly achieved by solution compounding and the enhancement of the electrical conductivity at the same level of filler by improved filler dispersion.

EXAMPLE 5

Improvement of Injection Molding Performance after the Addition of Calcium Carbonate Over PPC-PA1.0-FE1-2%

Calcium carbonate (nCC1 as in example 3) was melt compounded with 1 wt % of PA and a 2 wt % of a fluoroelastomer (Viton freeflow RC—Dupont, denoted FE1 in this document) under the same compounding conditions and machinery as in example 3, table 10. Subsequently the pellets were injection in an Arburg IM using a holding pressure of 500 MPa and average barrel temperature of 170° C. Testing dog bones and disks were made to evaluate the injection moulding performance and hot pressed plates were made for DMA.

The characterization of Length of dogbones (as an indication of the degree of shrinkage since the size of the mold is approximately the size of the ps reference) and E'(measured at 20° C. as an indication of the stiffness) are presented in Table 11. An improvement of the dimensional stability and increase of stiffness upon the addition of nCC1 can be concluded Table 11.

TABLE 11

E' modulus(stiffness) and average length of dogbones of composites of calcium carbonate (nCC1) compounded on PPC-PA1,0-FE1-2%

| | 0% nCC1 | 15% nCC1 | 30% nCC1 | 45% nCC1 | Reference Polystyrene low shrinkage (PS) |
|---|---|---|---|---|---|
| Average length cm | 13.0 | 13.1 | 14.0 | 15.1 | 15.2 |
| E'@20° C. (MPa) | 744 | 1441 | 2154 | 972 | — |

EXAMPLE 6

Use of an Alternative Dianhydride and the Effect of a Fluoroelastomer

Table 12/13 describes the preparation and characterization of materials based on PPC to illustrate the effect of BPHA (benzophenone tetracarboxylic dianhydride) (an alternative dianhydride to PA) and the effect of a fluoroelastomer (FE1) on two different types of composites. The PPC used is the same as in example 3, table 10.

It is seen that increasing the loading of BPHA increased the stiffness (E') measured at 20 and 30° C.; this effect is accompanied by a slight increase of Tg of 3° C. Also comparing the composites PPC-BPHA-1,5-nCC1-30%-FE1-2% in the current example vs PPC-PA-1,5-nCC1-30%-FE1-2% in example 6 it can be concluded that the addition of BPHA has a similar effect as that of PA given their same nature as dianhydrides and the comparable molar acid loading in the examples (since an addition of 1.6 wt % BPHA has approximately the same acid content as that of 1.0 wt % PA).

The comparison of E' (stiffness) measured at 20 and 30° C. for PPC-BPHA-1,5-nCC1-30% vs. PPC-BPHA-1,5-nCC1-30%-FE1-2% and PPC-PA1,0-GNP3-30% vs. PPC-PA1,0-GNP3-30%-FE1-2% shows that the addition of a 2 wt % of FE1 is beneficial for the stiffness of PPC based composites and it may also decrease the occurrence of shark skin or melt fracture during molding.

As in other previous examples the addition of fillers improves the stiffness and Tg more, in particular, when the addition of an anisotropic filler like GNP3 is compared to an isotropic filler like nCC1 at the same filler loading.

Table 12. Effect of the compounding of PA, BPHA and FE1 on the stiffness of PPC based compounds (PPC and PA as from example 1, BPHA(Benzophenone-3,3',4,4'-tetracarboxylic dianhydride 96% from Sigma Aldrich), FE1 as in example 5)

TABLE 12

| Sample # | Matrix | Sample Name | Filler |
|---|---|---|---|
| 1 | PPC | PPC-BPHA-0,75% | — |
| 2 | PPC | PPC-BPHA-1,5% | — |
| 3 | PPC-BPHA-1,5 | PPC-BPHA-1,5%-nCC1-30% | nCC 1 |
| 4 | PPC-BPHA-1,5 | PPC-BPHA-1,5-nCC1-30%-FE1-2% | nCC 1 |
| 5 | PPC-PA1,0 | PPC-PA1,0%-GNP3-30% | GNP 3 |
| 6 | PPC-PA1,0 | PPC-PA1,0-GNP3-30%-FE1-2% | GNP 3 |

TABLE 13

DMA properties

| | Sample Name | E' @20° C. (MPa) | E'@30° C. (MPa) | Tg (° C.) |
|---|---|---|---|---|
| 1 | PPC-BPHA-0,75% | 875 | 23 | 28.1 |
| 2 | PPC-BPHA-1,5% | 1188 | 33 | 28.6 |
| 3 | PPC-BPHA-1,5%-nCC1-30% | 2215 | 130 | 31.3 |
| 4 | PPC-BPHA-1,5-nCC1-30%-FE1-2% | 2312 | 169 | 31.3 |
| 5 | PPC-PA1,0%-GNP3-30% | 5376 | 3790 | 40.3 |
| 6 | PPC-PA1,0-GNP3-30%-FE1-2% | 5657 | 4160 | 41.1 |

TABLE 14

Polymers used for compound in example 7

| Polymer | Producer | Grade |
|---|---|---|
| FE1 | DuPont Performance Elastomers | Viton Freeflow RC |
| PP1 | Borealis | RF365MO |
| PP2 | Borealis | BE170MO |
| PLA1 | Nature Works | Ingeo 3052D |

TABLE 15

Compositions and compounding conditions in example 7

| Sample # | 1 | 2 | 3 | 4 |
|---|---|---|---|---|
| Matrix | PPC-PA-1%-FE1-2% | PPC-PA-1%-FE1-2%-nCC1-30% | PPC-PA-1%-FE1-2%-nCC1-30% | PPC-PA-1%-FE1-2%-nCC1-30% |
| Sample Name | PPC-PA-1%-FE1-2%-nCC1-30% | [PPC-PA-1%-FE1-2%-nCC1-30%]-50% BL PP1-50% | [PPC-PA-1%-FE1-2%-nCC1-30%]-50% BL PP2-50% | [PPC-PA-1%-FE1-2%-nCC1-30%]-50% BL PLA1-50% |
| Filler | nCC 1 | nCC 1 | nCC 1 | nCC 1 |
| POLYMER 2 | | RF365MO | BE170MO | Ingeo 3052D |
| Compounder | Prism 16/mild screw | Prisma 16/mild screw | Prisma 16/mild screw | Prisma 16/mild screw |
| CompT (° C.) | 140 | 180 | 180 | 180 |
| IRGANOX B215 (ppm) | 1500 | 1500 | 1500 | 1500 |
| IRGANOX E201 (ppm) | 0 | 0 | 0 | 2000 |
| Calcium Stearate (ppm) | 500 | 500 | 500 | 500 |

EXAMPLE 7

Use of PP and PLA to Improve the Stiffness of PPC-PA-1,0%-FE1-2%

Calcium carbonate (nCC1 as in example 3) was melt compounded with 1 wt % of PA and a 2 wt % of a fluoroelastomer (Viton freeflow SC—Dupont FE1) under the same compounding conditions and machinery as in example 3, table 11 to produce the sample 1 in Table 15. Sample 1 PPC-PA-1%-FE1-2%-nCC1-30% was used as a matrix to add a second polymer using similar loadings of sample 1 and a third polymer (in addition to PPC and FE1) to prepare samples 2 to 4. Samples 2 and 3 were prepared using a random and a block PP copolymer (PP1 and PP2). Sample 4 was prepared by adding PLA. (See Table 14 for the commercial grades and producers of FE1, PP1, PP2, PLAT). The actual recipes including additives and compatibilizers, machinery and compounding conditions are shown in Table 15. The results of the tensile characterizations on injection moulded dogbones (done at 170° C.) show that rigid polymers like PP and PLA are excellent mechanical reinforcements for PPC based composites since in all cases the stiffness was higher for the composite blends (stiffness of sample 1«stiffness of samples 2, 3,4) (See table 16)

TABLE 16

Tensile modulus from samples in example 7

| Sample # | Sample Name | Tensile modulus (MPa) |
|---|---|---|
| 1 | PPC-PA-1%-FE1-2%-nCC1-30% | 20 |
| 2 | [PPC-PA-1%-FE1-2%-nCC1-30%]-50% BL PP1-50% | 650 |
| 3 | [PPC-PA-1%-FE1-2%-nCC1-30%]-50% BL PP2-50% | 870 |
| 4 | [PPC-PA-1%-FE1-2%-nCC1-30%]-50% BL PLA1-50% | 2300 |

The invention claimed is:

1. A composition comprising a poly(alkylene carbonate) having a Mn of 20,000 g/mol or more which has been modified by compounding the poly(alkylene carbonate) with a modifying agent, wherein the modifying agent has: i) at least three carboxylic acid groups, ii) at least one carboxylic acid group and at least one anhydride group, or iii) at least two anhydride groups; and wherein said composition further comprises a particulate filler selected from the group consisting of carbon black, carbon nanotubes, cellulose, layered or tube like aluminosilicates, layered double hydroxides, metal oxides, boron nitride, mica, polyhedral oligomeric silsesquioxane, silica, calcium carbonate, talc, and graphitic fillers.

2. The composition as claimed in claim 1, wherein the modifying agent comprises two anhydride units.

3. The composition as claimed in claim 1, wherein the modifying agent is present in an amount of from 0.05 to 5 wt % relative to the amount of poly(alkylene carbonate) and modifying agent present in total.

4. The composition as claimed in claim 1, wherein the poly(alkylene carbonate) is formed from the copolymerization of an epoxide and carbon dioxide.

5. The composition as claimed in claim 1, wherein the filler is present in an amount of from 0.05 to 70 wt % relative to the total amount of filler and modified poly(alkylene carbonate).

6. The composition as claimed in claim 1, wherein the poly(alkylene carbonate) has an Mw of 5,000 D or more.

7. The composition of claim 1 further comprising a second polymer.

8. The composition as claimed in claim 7, wherein the second polymer is a fluoroelastomer.

9. The composition as claimed in claim 1, wherein the modifying agent comprises pyromellitic dianhydride or benzophenone-3,3',4,4'-tetracarboxylic dianhydride.

10. The composition as claimed in claim 1, wherein the poly(alkylene carbonate) is formed from the copolymerization of propylene oxide, ethylene oxide, cyclohexene oxide, or mixtures thereof and carbon dioxide.

11. The composition as claimed in claim 1, wherein the filler comprises a multiwalled nanotube, a graphitic filler, calcium carbonate, a montmorillonite nanoclay, a magnesium oxide, a zinc oxide, a zirconium oxide, or a polyhedral oligomeric silsesquioxane.

12. The composition as claimed in claim 7, wherein the second polymer is a polyolefin, polylactic acid, starch, or polyhydroxy acid.

13. The composition as claimed in claim 1 further comprising a plasticizer.

14. The composition as claimed in claim 1 further comprising a second poly(alkylene carbonate) that is different than the first poly(alkylene carbonate).

15. The composition as claimed in claim 1, wherein the filler is a multiwalled nanotube.

16. The composition as claimed in claim 1, wherein the filler is calcium carbonate.

17. The composition as claimed in claim 1, wherein the composition is electrically conductive.

18. An article comprising the composition as claimed in claim 1, wherein the article is a film, molded article, extrusion coated article, foamed article or laminate.

* * * * *